(12) United States Patent
Hong et al.

(10) Patent No.: US 9,900,269 B2
(45) Date of Patent: Feb. 20, 2018

(54) SHORT MESSAGE SERVER, TERMINAL TRIGGER METHOD OF SERVER THEREOF, TRIGGER REQUEST DELIVERY SERVER, TRIGGER REQUEST DELIVER METHOD OF SERVER THEREOF

(71) Applicant: KT CORPORATION, Gyeonggi-do (KR)

(72) Inventors: Sung Pyo Hong, Seoul (KR); Soo Hyun Cho, Seoul (KR); Hyun Song Lee, Seoul (KR); Sung Hoon Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 172 days.

(21) Appl. No.: 14/350,743

(22) PCT Filed: Oct. 5, 2012

(86) PCT No.: PCT/KR2012/008101
§ 371 (c)(1),
(2) Date: Apr. 9, 2014

(87) PCT Pub. No.: WO2013/055063
PCT Pub. Date: Apr. 18, 2013

(65) Prior Publication Data
US 2014/0258434 A1    Sep. 11, 2014

(30) Foreign Application Priority Data
Oct. 10, 2011   (KR) .................. 10-2011-0103220

(51) Int. Cl.
*H04W 4/14* (2009.01)
*H04L 12/58* (2006.01)
(Continued)

(52) U.S. Cl.
CPC ............. *H04L 51/04* (2013.01); *H04W 4/005* (2013.01); *H04W 4/14* (2013.01);
(Continued)

(58) Field of Classification Search
CPC ......... H04W 4/14; H04W 4/12; H04W 12/06; H04L 12/58; H04L 12/589
See application file for complete search history.

(56) References Cited

U.S. PATENT DOCUMENTS 7,715,856 B2   5/2010   Shaheen
7,899,477 B2   3/2011   Shaheen
(Continued)

FOREIGN PATENT DOCUMENTS

KR   10-2003-0025564 A   3/2003
KR   10-2006-0092805 A   8/2006
(Continued)

OTHER PUBLICATIONS

HTC, "Evaluation of MTC Device triggering", 3GPP TSG SA WG2 Meeting #83, TD S2-110732, Feb. 21-25, 2011, Salt Lake City, Utah, USA, pp. 1-2.

*Primary Examiner* — Barbara B Anyan
(74) *Attorney, Agent, or Firm* — IP Legal Services, LLC (57) ABSTRACT

The present application relates to a control function related to a trigger in a communication network for machine-type communication. A method for triggering a terminal comprises the steps of: receiving a trigger request message from a trigger request transmission server which transmits trigger requests from external servers; and transmitting the trigger request message to a terminal using a received short message, wherein transmission parameters of the short message indicates that the received short message is a short message for triggering a machine-type communication (MTC) apparatus.

17 Claims, 6 Drawing Sheets

(51) Int. Cl.
  *H04W 4/00* (2018.01)
  *H04L 29/06* (2006.01)
  *H04L 29/12* (2006.01)
  *H04W 4/12* (2009.01)

(52) U.S. Cl.
  CPC .. *H04L 29/12273* (2013.01); *H04L 29/12754* (2013.01); *H04L 61/103* (2013.01); *H04L 61/1588* (2013.01); *H04L 61/6054* (2013.01); *H04L 63/0464* (2013.01); *H04L 63/18* (2013.01); *H04W 4/12* (2013.01)

(56) References Cited

U.S. PATENT DOCUMENTS

| | | | |
|---|---|---|---|
| 8,175,626 B2 | 5/2012 | Shaheen | |
| 2007/0016364 A1* | 1/2007 | Lee | G08G 1/14 701/408 |
| 2007/0254648 A1* | 11/2007 | Zhang | H04L 29/06027 455/433 |
| 2008/0114881 A1* | 5/2008 | Lee | H04L 12/58 709/227 |
| 2008/0133930 A1* | 6/2008 | Moshir | G06F 21/35 713/183 |
| 2009/0111424 A1* | 4/2009 | Bengtsson | H04L 63/18 455/411 |
| 2009/0265552 A1* | 10/2009 | Moshir | H04L 63/0464 713/168 |
| 2010/0178904 A1* | 7/2010 | Low | G06Q 30/02 455/415 |
| 2011/0098066 A1* | 4/2011 | Goermer | H04M 15/06 455/466 |
| 2011/0292923 A1* | 12/2011 | Noldus | H04Q 3/0025 370/338 |
| 2011/0319075 A1* | 12/2011 | Sharma | H04W 4/14 455/432.2 |
| 2012/0264451 A1 | 10/2012 | Kim et al. | |
| 2012/0282956 A1 | 11/2012 | Kim et al. | |
| 2012/0302229 A1* | 11/2012 | Ronneke | H04L 29/12754 455/422.1 |
| 2013/0155920 A1* | 6/2013 | Lim | H04W 4/12 370/310 |
| 2013/0279458 A1* | 10/2013 | Farkas | H04L 29/12273 370/329 |
| 2014/0155112 A1* | 6/2014 | Molnar | H04L 65/1016 455/466 |

FOREIGN PATENT DOCUMENTS

| | | |
|---|---|---|
| KR | 10-2011-0067717 A | 6/2011 |
| KR | 10-2011-0081750 A | 7/2011 |
| KR | 10-2011-0093582 A | 8/2011 |

* cited by examiner

SHORT MESSAGE SERVER, TERMINAL TRIGGER METHOD OF SERVER THEREOF, TRIGGER REQUEST DELIVERY SERVER, TRIGGER REQUEST DELIVER METHOD OF SERVER THEREOF

CROSS REFERENCE TO RELATED APPLICATIONS

This application is a National Stage Patent Application of PCT International Patent Application No. PCT/KR2012/008101 (filed on Oct. 5, 2012) under 35 U.S.C. § 371, which claims priority to Korean Patent Application No. 10-2011-0103220 (filed on Oct. 10, 2011), the teachings of which are incorporated herein in their entireties by reference.

TECHNICAL FIELD

The present disclosure relates to a control function related to a trigger in a communication network for machine-type communication.

BACKGROUND ART

Machine type communication (MTC) as one type of data communications may refer to device to device or machine to machine communication where one or more entities cannot, or can minimally, require interaction with a human in the process of communication. A MTC user terminal or MTC apparatus such as an electric meter, a gas meter, a bending machine and the like equipped with a mobile communication module can communicate with a MTC server (e.g., SCS (service capability server) or MTC application server) which controls the MTC apparatus and collects data through a mobile network of a mobile network operator.

A lot of MTC application services provided through MTC communication infrequently transmit data with long duration. In case of this application service, a MTC user can make a MTC apparatus regularly (or periodically) initiate data communication and transmit the data to the MCT server through the mobile network of the mobile network operator. As another scheme, a request of the MTC server for control and management for the MTC apparatus and data collection on demand of the user can make a MTC apparatus regularly (or periodically) initiate data communication and transmit the data to the MTC server through the mobile network of the mobile network operator. When a trigger request of the MTC server is transmitted through the mobile network of the mobile network operator and when the MTC apparatus receives the trigger request and initiates the data communication and communicates with the MTC server through the mobile network of the mobile network operator may be referred to as MTC apparatus triggering.

Use of short message service (SMS) can be considered as a message transmitted to a terminal for such MTC apparatus triggering.

DISCLOSURE OF INVENTION

Technical Problem

An objective of the present embodiment is to provide a server and a method of triggering a terminal by using SMS in a communication network for MTC.

Technical Solution

In order to accomplish the above-described objective, in accordance with at least one embodiment, a short message server may be provided. The short message server may include an interface module of a server side configured to receive a terminal trigger request from an external server; a terminal identifier mapping module configured to map a identifier of the terminal except for a MSISDN (Mobile Subscriber ISDN Number) to an IMSI (International Mobile Subscriber Identity) of the terminal when the identifier of the terminal is not the MSISDN; a generation module of a short message configured to change the trigger request to the short message; and an interface module of a short message server side configured to deliver the short message to the terminal using the IMSI of the terminal.

In accordance with another embodiment, a short message server may be provided. The short message server may include an interface module of a server side configured to receive a terminal trigger request from an external server; a generation module of a short message configured to change the trigger request to a short message; and an interface module of terminal side configured to receive whether the transmission of the short message to the terminal is successful, wherein the interface module of the server side delivers, to the external server, whether the transmission of the short message is successful.

In accordance with yet another embodiment, a short message server may be provided. The short message server may include an interface module of a server side configured to receive a terminal trigger request from an external server; a generation module of a short message configured to change the trigger request to a short message; and an interface module of terminal side configured to deliver the short message to the terminal and receive, whether the transmission of the short message to the terminal is successful, wherein the interface module of the server side delivers, to the external server, whether the transmission of the short message is successful; and a determination module of a duplicate message configured to determine the following trigger request as a duplicate message when receiving the trigger request includes the same identifier of the terminal or the same identifier of the external server within the validity time thereof and report a determination of the duplicate message to the external server.

In accordance with still another embodiment, a trigger request delivery server may be provided. The trigger request delivery server may include an interface module of a server side configured to receive a trigger request of the terminal from an external server; a terminal identifier mapping module configured to map a identifier of the terminal except for a MSISDN (Mobile Subscriber ISDN Number) to an IMSI (International Mobile Subscriber Identity) of the terminal when the identifier of the terminal is not the MSISDN; and an interface module of a short message server side configured to generate a short message using the trigger request and the IMSI of the terminal and transmit the short message to the terminal.

In accordance with yet still another embodiment, a trigger request delivery server may be provided. The trigger request delivery server may include an interface module of a server side configured to receive a trigger request of the terminal from an external server; and an interface module of a short message server side configured to generate a short message, transmit the generated message to a short message server which delivers it to the terminal and receives whether the transmission of the short message for the short message server is successful, wherein the interface module of the server side delivers, to the external server, whether the transmission of the short message is successful.

In accordance with still another embodiment, a trigger request delivery server may be provided. The trigger request delivery server may include an interface module of a server side configured to receive a trigger request of the terminal from an external server; an interface module of a short message server side configured to generate a short message, transmit the generated message to a short message server which delivers it to the terminal and receive whether the transmission of the short message for the short message server is successful; and a determination module of a duplicate message configured to determine the following trigger request as a duplicate message when receiving the trigger request including the same identifier of the terminal or the same identifier of the external server within the validity time thereof included in the trigger request and report a determination of the duplicate message to the external server.

In accordance with still another embodiment, a method may be provided for delivering a trigger request in a short message delivery server. The method may include receiving the trigger request of the terminal from the external server; mapping an identifier of the terminal except for a MSISDN (Mobile Subscriber ISDN Number) to an IMSI (International Mobile Subscriber Identity) of the terminal when the identifier of the terminal is not the MSISDN; and transmitting the generated short message using the IMSI of the terminal to the terminal.

In accordance with still another embodiment, a method may be provided for delivering a trigger request in a short message delivery server. The method may include receiving the trigger request of the terminal from the external server; changing the trigger request to a short message; delivering the short message to the terminal and receiving whether the transmission of the short message to the terminal is successful; and determining the following trigger request as a duplicate message when receiving the trigger request including the same identifier of the terminal or the same identifier of the external server within the validity time thereof and report a determination of the duplicate message to the external server.

In accordance with still another embodiment, a method may be provided for delivering a trigger request in a trigger request delivery server. The method may include receiving the trigger request of the terminal from the external server; changing the trigger request to a short message; transmitting the short message to a terminal and receiving whether the transmission of the short message to the terminal is successful; and determining the following trigger request as a duplicate message when receiving the trigger request including the same identifier of the terminal or the same identifier of the external server within the validity time thereof and report a determination of the duplicate message to the external server.

In accordance with still another embodiment, a method may be provided for delivering a trigger request in a trigger request delivery server. The method may include receiving the trigger request of the terminal from the external server; mapping an identifier of the terminal except for a MSISDN (Mobile Subscriber ISDN Number) to an IMSI (International Mobile Subscriber Identity) of the terminal when the identifier of the terminal is not the MSISDN; and generating the short message using and trigger request and the IMSI of the terminal and transmitting it to a short message server which delivers it to the terminal.

In accordance with still another embodiment, a method may be provided for delivering a trigger request in a trigger request delivery server. The method may include receiving the trigger request of the terminal from the external server; generating a short message with the trigger request, transmitting the generated message to a short message server which delivers it to the terminal and receiving whether the transmission of the short message for the short message server is successful; and delivering, to the external server, whether the transmission of the short message is successful.

In accordance with still another embodiment, a method may be provided for delivering a trigger request in a trigger request delivery server. The method may include receiving the trigger request of the terminal from the external server; generating a short message with the trigger request, transmitting the generated message to a short message server which delivers it to the terminal and receiving whether the transmission of the short message for the short message server is successful; and determining the following trigger request as a duplicate message when receiving the trigger request including the same identifier of the terminal or the same identifier of the external server within the validity time thereof included in the trigger request and reporting a determination of the duplicate message to the external server.

Advantageous Effects

According to the above-described embodiments, the server and the method may trigger the terminal by using SMS in the communication network for MTC.

MODE FOR CARRYING OUT THE INVENTION

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

The present embodiments will be described based on an MTC communication. Herein, the MTC communication may be variously referred to as a machine to machine (M2M) communication, Internet of things (IoT), a smart device communication (SDC), or a machine oriented communication (MOC).

Machine type communication (MTC) as one type of data communications may refer to device to device or machine to machine communication where one or more entities cannot, or can minimally, require interaction with a human in the process of communication. A MTC user terminal or MTC apparatus such as an electric meter, a gas meter, a bending machine and the like equipped with a mobile communication module can communicate with a MTC server (e.g., SCS (service capability server) or MTC application server) which controls the MTC apparatus and collects data through a mobile network of a mobile network operator.

A lot of MTC application service is provided through MTC communication and infrequently transmits data with a long duration. In case of this application service, a MTC user can make a MTC apparatus regularly (or periodically) initiate data communication and transmit the data to the MCT server through the mobile network of the mobile network operator. As to another scheme, a request of the MTC server for control and management for the MTC apparatus and data collection on demand of the user can make a MTC apparatus regularly (or periodically) initiate data communication and transmit the data to the MTC server through the mobile network of the mobile network operator. When a trigger request of the MTC server is transmitted through the mobile network of the mobile network operator and the MTC apparatus receiving the trigger request initiates the data communication and communicates with the MTC server through the mobile network of the mobile network operator may be referred to as MTC apparatus or MTC terminal triggering.

Figure 1:
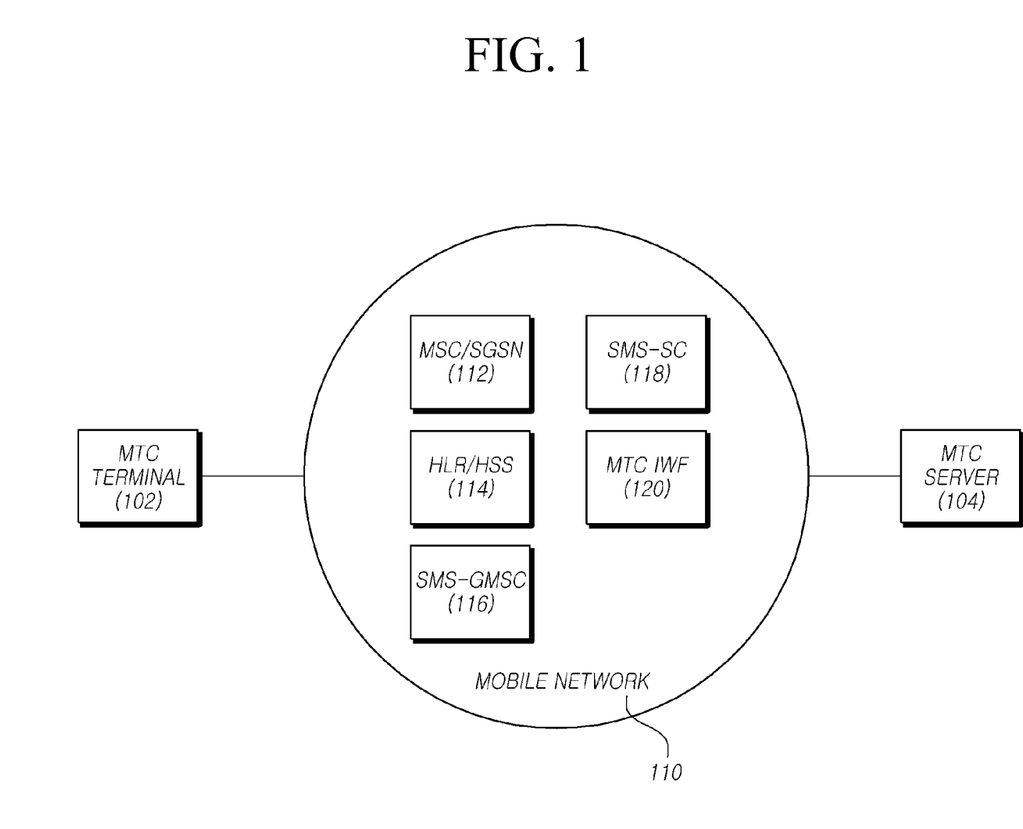
FIG. 1 illustrates a structure of a communication network in which a MTC-IWF (Machine Type Communication-InterWorking Function) is included.

FIG. 1 illustrates a structure of a communication network in which a MTC-IWF (Machine Type Communication-InterWorking Function) is included.

Referring to FIG. 1, a MTC terminal 102 may communicate with one or more MTC server 104 through a mobile network 110.

The mobile network 110 may include a MSC/SGSN (Mobile Switching Center/Serving GPRS Support Node) 112, a HLR/HSS (Home Location Register/Home Subscriber Server) 114, a SMS-GMSC (Short Message Service-Gateway Mobile Switching Center) 116, a SMS-SC (Short Message Service-Service Center) 118, a MTC-IWF (Machine Type Communication-InterWorking Function) 120, and the like.

For general SMS, a short message transmitted from SME (Short Message Entity) is received by the SMS-SC 118 and the SMS-SC 118 may transmit the short message to the SMS-GMSC 116. The SMS-GMSC 116 may interrogate necessary routing information to the HLR/HSS 114 in order to deliver the short message. When interrogating the routing information, the SMS-GMSC 116 may use a MSISDN (Mobile Subscriber ISDN Number) as an identity of the terminal. The SMS-GMSC 116 interrogating the routing information may transmit the short message to the MSC/SGSN 112 and then the MSC/SGSN 112 may transmit it to the terminal 102. The MSC/SGSN 112 may report a message for success of delivering the short message to the SMS-GMSC 116. The SMS-GMSC 116 may update information on the HLR/HSS 114 when the user terminal performs network attach and the transmission of the short message is successful, in a state that there is previously failed the transmission of the short message because of network attach release or network detach and the like so that indication about terminal inaccessible and the like may be configured through the HLR/HSS 114. The SMS-GMSC 116 may report the message for success of delivering the short message to the SMS-SC 118.

When there is failed transmission of the short message from the MSC/SGSN 116 to the terminal 102, the SMS-GMSC 116 reports the failure of transmission and the SMS-SC 118 performs retransmission of the short message according to pre-configured retransmission scheme.

Figure 2:
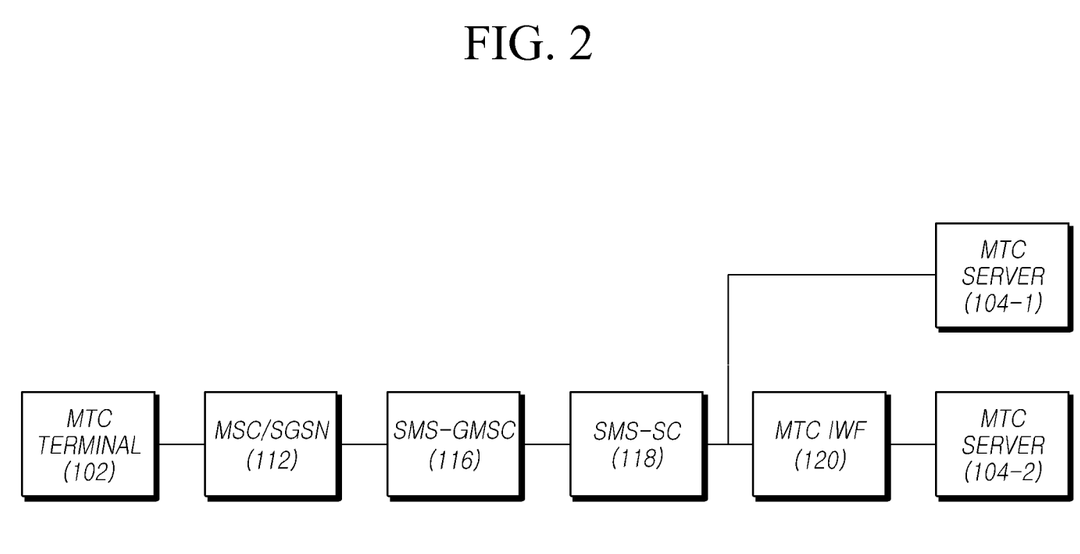
FIG. 2 illustrates a structure of delivering a terminal trigger request by using SMS.

Such a transmission scheme may be used for the terminal triggering. FIG. 2 illustrates a structure of delivering a terminal trigger request by using the SMS.

Referring to FIG. 2, MTC servers 104-1 and 104-2 requesting the terminal triggering may deliver a trigger request message to the SMS-SC 118 as the SME. The MTC server 104-1 may directly deliver the trigger request message to the SMS-SC 118 or the MTC server 104-2 may deliver the trigger request message to the SMS-SC 118 through the MTC-IWF 120. The SMS-SC 118 may transfer the short message including the trigger request message to the terminal 102 through the SMS-GMSC 116 and the MSC/SGSN 112. The short message may include address information of the MTC server 104 (e.g., IP address) so that the terminal 102 can perform the data communication with the server 104. The calling phone number of the short message may be MSISDN to which the MTC server 104 is allocated and the called phone number thereof may be MSISDN of the terminal 102.

In this system, when there is a failed transmission of the short message such as the transmission of the short message is delayed because of the network detach of the terminal 102 and the like, it is difficult for the MTC server 104 to instantaneously confirm information about the status of delivery so that the MTC server 104 can continuously transmit the trigger request in spite of the failure of the transmission of the short message, which may cause an unexpected network load.

The terminal triggering scheme using the SMS may be configured to operate only when the MSISDN is set to the calling phone number. MSISDN resource may be insufficient according to the increase of the MTC terminal 102. Further, this scheme may generally not be used when using any other terminal identity (e.g., FQDN (Fully Qualified Domain Name), NAI (Network Access Identifier), SIP (Session Initiation Protocol) URI (Uniform Resource Identifier), IP address, and the like) other than the MSISDN.

Figure 3:
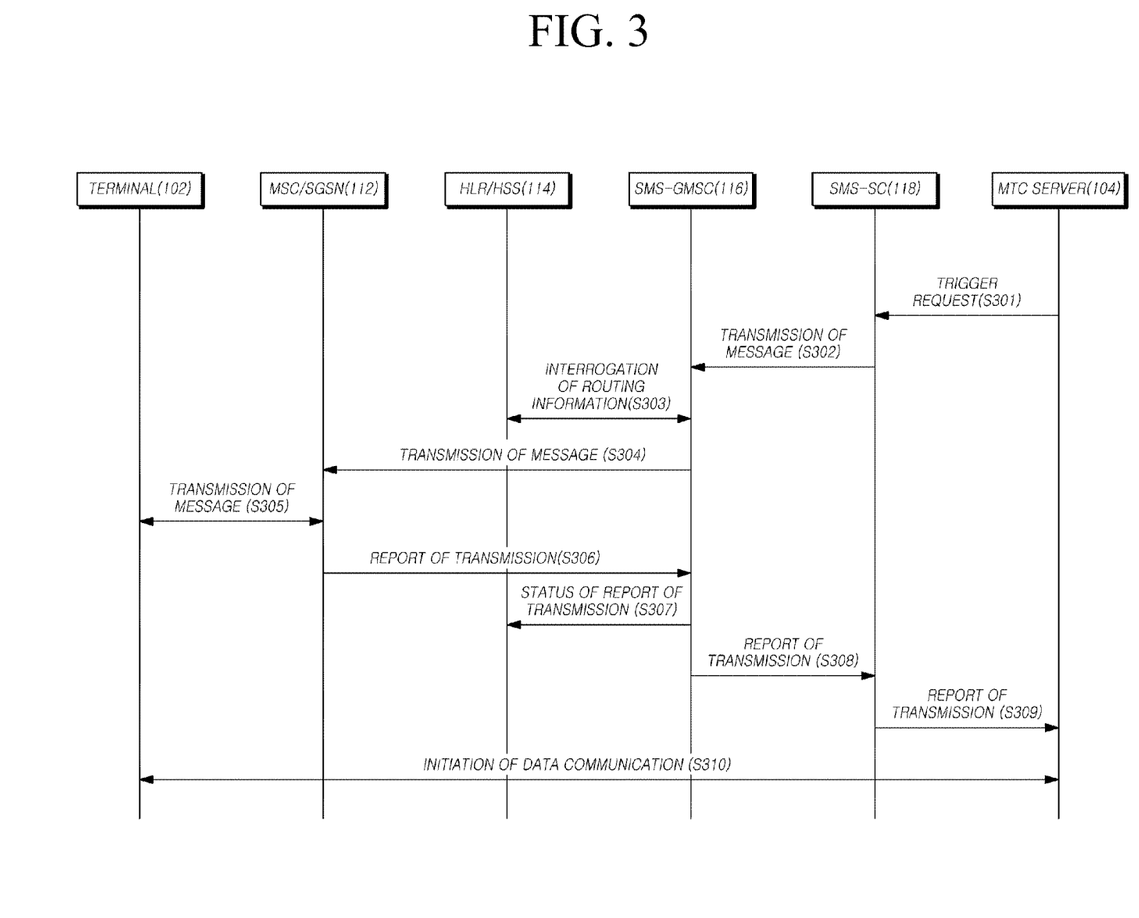
FIG. 3 is a flowchart illustrating a method of performing the terminal triggering using SMS according to one embodiment.

FIG. 3 is a flowchart illustrating a method of performing the terminal triggering using the SMS according to at least one embodiment.

Referring to FIG. 3, the MTC server 104 may transmit the trigger request message to the SMS-SC 118. The MTC server 104 may perform the SME function capable of transmitting and receiving the short message through the SMS-SC 118. The MTC server 104 may transmit the trigger request message by using one of SMPP (Short Message Peer to Peer) protocol for an interface between general SME and the SMS-SC 118, protocol for an interface between SME based on TCP/IP and the SMS-SC 118, and changed protocol thereof. The MTC server 104 may know information about either the SMS-SC 118 or the MTC server 104, such as the address of the SMS-SC 118 or the address of MTC server 104.

The trigger request message may include all or some of information indicating a table 1 below.

TABLE 1

| Parameter | Description | Remarks |
|---|---|---|
| Validity time | Information on time where a trigger request is stored within network when the trigger request cannot be transmitted to a device. | |
| MTC external | Information for identifying a MTC device user terminal used in an external of 3GPP(3rd | |

TABLE 1-continued

| Parameter | Description | Remarks |
|---|---|---|
| identifier | Generation Partnership Project) system which can use one of MSISDN, FQDN(Fully Qualified Domain Name), NAI(Network Access Identifier), SIP URI, IP address and the like. | |
| MTC server identifier | Information for identifying a MTC server capable of requesting a device triggering through mobile network of a mobile network operator which can use one of MSISDN, FQDN(Fully Qualified Domain Name), NAI(Network Access Identifier), SIP URI, IP address and the like and be used for billing a device triggering and the like. | |
| Application ID | Information for identifying an application which is operated in a MTC device user terminal by a trigger request of a MTC server. | |
| Priority | Information indicating priority and urgent process necessary for indicating whether there is priority (e.g., whether there is performed the trigger request in case of a number of the trigger request which must be processed than the network capacity) in a overload state of mobile network of a mobile network operator. | |
| Application specific information | Information specific for being used by an application of a MTC device to which a trigger request is delivered (e.g., the number of port of a application, URL and the like). | |
| Protocol identifier | Identifier for indicating what the trigger request is transmitted by protocol for a MTC device triggering. | |
| Message transmission scheme | Information including the time and the number of retransmission when it fails to transmit a SMS from the SMS-SC to a MTC device. | |

The SMS-SC 118 may perform load control for the trigger request, authentication for the MTC server, authentication on whether the MTC server has right to request the triggering to the terminal by using the SMS, and the like.

In order to perform the load control for the trigger request, the SMS-SC 118 may perform the load control by managing a number of the incoming trigger requests from a specific MTC server or a number of incoming trigger requests from all MTC servers. If either the number of the incoming trigger requests from specific MTC server or the number of the incoming trigger requests from all MTC servers exceeds the predetermined threshold value, or if the request information restricting the specific trigger request or all trigger requests is input (for example, by the operator of the network), the SMS-SC 118 may either restrict the process for new trigger requests or report to the MTC server 104 that it is unable to process the trigger request because of the overload state. If The SMS-SC 118 keeps the trigger request until the overload state is released and then the overload state is released, it is capable of processing the trigger request. It is possible to process the trigger request either with higher priority based on the priority in the table 1 or urgent in spite of the overload state.

In order to authenticate the MTC server, the SMS-SC 118 may prepare identifier information on the MTC server 104 capable of requesting the triggering in advance. In order to permit authority, it is possible to prepare the table in which the identifier of the terminal 102 is mapped with the identifier of the MTC server 104 capable of requesting the trigger for the terminal 102. Such the table may be prepared at an external entity such as the HLR/HSS 114 and the SMC-SC 118 may access it through MAP (Mobile Application Part) protocol and the like.

When the external identifier of the terminal 102 included in the trigger request may not be any other type except for the MSISDN (e.g., FQDN (Fully Qualified Domain Name), NAI (Network Access Identifier), SIP URI (Session Initiation Protocol Uniform Resource Identifier), IP address, and the like), the SMS-SC 118 may be provided with the mapping table between the identifier of the terminal 102 and IMSI (International Mobile Subscriber Identity) capable of identifying it within the mobile network of the mobile network operator. The external entity such as the HLR/HSS 114 may also be provided with the mapping table in advance and the SMS-SC 118 may access the IMSI information of the external entity through the MAP protocol.

The SMS-SC 118 delivers, to the SMS-GMSC 116, the message including some of information included in the received trigger request. Some of information above may be mapped to one of SMS application protocol parameter, SMS transfer layer protocol parameter and SMS relay layer protocol parameter to be delivered.

For example, the SMS-SC 118 may include information on the validity time in one of SMS application protocol parameter, SMS transfer layer protocol parameter and SMS relay layer protocol parameter.

The SMS-SC 118 may include information on the priority in one of SMS application protocol parameter, SMS transfer layer protocol parameter and SMS relay layer protocol parameter. The information on the priority may be delivered as its value or as a mapping relationship. The information on the priority may be used for processing a message in the network with priority or determining priority of network access used for the configuration of PDD context.

The SMS-SC 118 may make the information on the application ID included in the trigger request as being included in the SMS transfer layer protocol parameter, for example a TP-UD (Transfer Protocol-User Data). The value of the application ID may be the value of an application port and have an address range with 8 or 16 bits. The value of the application ID may be used for identifying trigger application/function operated by the terminal 102.

The SMS-SC 118 may make the information on the protocol identifier included in the trigger request as being included in the SMS transfer layer protocol parameter, for example a TP-PID (TP-Protocol Identifier). The information on the protocol identifier may identify whether or not the message is the short message for the MTC apparatus triggering and may be used for identifying the procedure on a message, retransmission scheme and the like.

The SMS-GMSC 116 may interrogate routing information through the HLR/HSS 114 at step S303. The SMS-GMSC 116 may interrogate the routing information using the MSISDN. When the external identifier of the terminal 102 is not the MSISDN, the SMS-GMSC 116 may interrogate the routing information to the SMS-SC 118 using the mapped IMSI.

The SMS-GMSC 116 transmits to the MSC/SGSN 112 the short message based on the routing information at step S304. The MSC/SGSN 112 transmits to the terminal the short message at step S305. The MSC/SGSN 112 reports the success or the failure of delivering the message to the SMS-GMSC 116 at step S306. The SMS-GMSC 116 updates information on the HLR/HSS 114 based on the transmission report at step S307 and reports the success or the failure of delivering the message to the SMS-SC 118 at step S308. The SMS-SC 118 reports the success or the failure of delivering the message, the cause of the failure and the like to the MTC server 104 at step S309. In the above-described scheme, the terminal 102 receiving the trigger request initiates the data communication with the MTC server 104 at step S310.

When the SMS-SC 118 receives the report with the failure of the transmission of the short message within the validity time included in the trigger request, the SMS-SC 118 may transmit the failure of the transmission including information on the cause of the failure. In such a case, the SMS-SC 118 may select the retransmission scheme or the number thereof from the trigger request and try the retransmission of the trigger request message to the terminal 102. Requirements for the retransmission may be set in advance. When the SMS-SC 118 receives the report about the failure of the transmission of the short message within the validity time included in the trigger request, the SMS-SC 118 may discard the short message and report the result to the MTC server 104.

Meanwhile, when the SMS-SC 118 receives the trigger request with information on the same terminal identifier and/or the same MTC server identifier within the validity time included in the previous trigger request, the SMS-SC 118 may determine the following trigger request as a duplicate message and report the result to the MTC server 104. As to one example, the SMS-SC may delete the duplicate message. As to other example, the SMS-SC may update the information included in the previous trigger request with the information included in the duplicate message.

Figure 4:
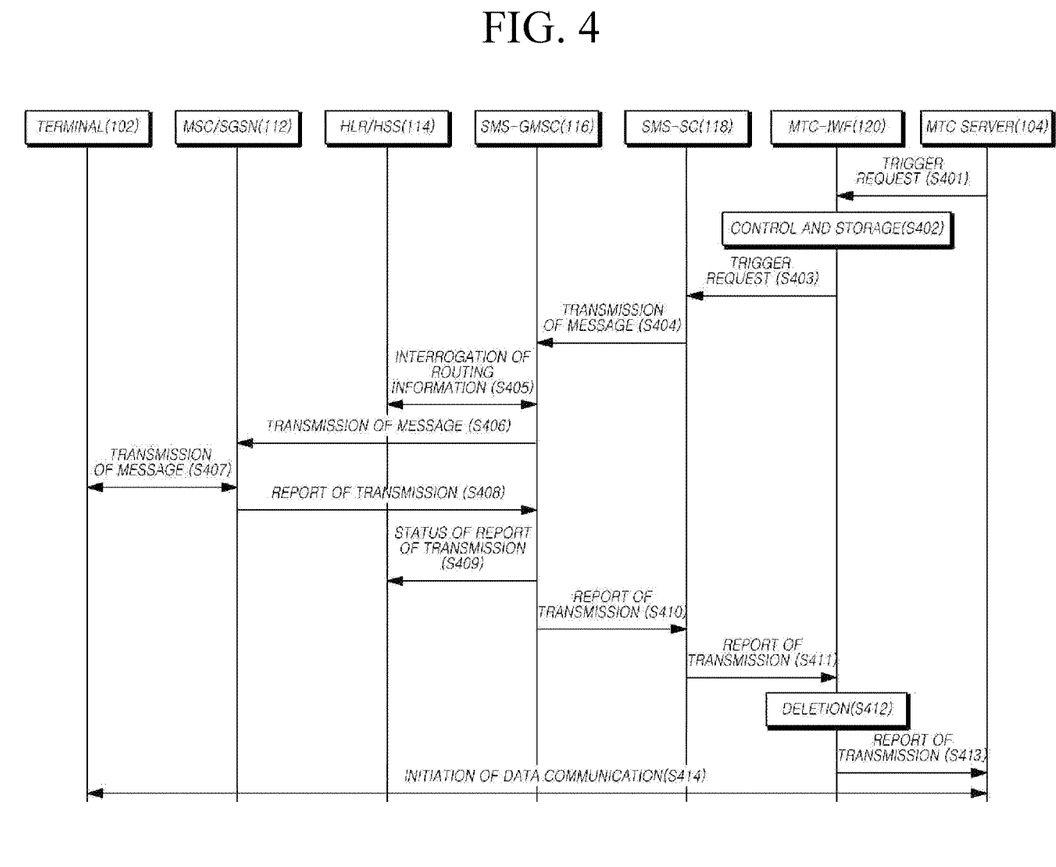
FIG. 4 is a terminal triggering method using SMS according to the other embodiment.

FIG. 4 is a terminal triggering method using the SMS according to another embodiment.

Referring to FIG. 4, the MTC server 104 transmits the trigger request message to the MTC-IWF 120 at step S401. The MTC server 104 may know the IP address of the MTC-IWF 120 which performs control function of the trigger for the specific terminal 102. The MTC server 104 may also know the domain name of the MTC-IWF 120 which performs control function of the trigger for the specific terminal 102 and access it via a DNS (Domain Name Server), thereby knowing the IP address thereof.

The trigger request message that the MTC server 104 transmits to the MTC-IWF 120 may include all or some of information indicated in the table 2 below.

The MTC-IWF 120 controls the triggering and stores control information at step S402. In detail, the MTC-IWF 120 may perform load control, authentication for the MTC server 104 and authentication on whether the MTC server has right to request the triggering to the specific terminal.

In order to perform the load control for the trigger request, the MTC-IWF 120 may perform the load control by managing the number of the incoming trigger requests from specific MTC server 104 or the number of the incoming trigger requests from all MTC servers 104. If either the number of the incoming trigger requests from specific MTC server 104 or the number of the incoming trigger requests from all MTC servers exceed the predetermined threshold value or if request information restricting the trigger request for the specific terminal or all terminal is input through the wireless network of the mobile network operator (for example, by the input of the operator), the MTC-IWF 120 may either restrict process for new trigger requests and report to the MTC server 104 whether it is unable to process the trigger request because of the overload state. If the MTC-IWF 120 keeps the trigger request until the overload state is released and then the overload state is released, it is capable of restarting the process of the trigger request. It is possible to perform the process of the trigger request based on the priority in the table 2 despite the overload state.

In order to authenticate the MTC server 104, the MTC-IWF 120 may be provided with identifier information on the MTC server 104 capable of requesting the triggering in advance.

In order to permit the MTC server 104 the authority of the trigger request for the specific terminal 102, the MTC-IWF 120 may be provided with the table including the identifier of the terminal 102 capable of triggering the terminal, and the identifier of the MTC server 104 capable of requesting the apparatus triggering for the terminal 102. Alternatively, The HLR/HSS 114 may be provided with the table above in advance and the MTC-IWF 120 may interrogate specific information through MAP (Mobile Application Part) protocol.

TABLE 2

| Parameter | Description | Remarks |
| --- | --- | --- |
| Validity time | Information on time where a trigger request is stored within network when the trigger request cannot be transmitted to a device. | |
| MTC device identifier | Information for identifying a MTC device user terminal which can use one of MSISDN, FQDN (Fully Qualified Domain Name), NAI (Network Access Identifier), SIP URI, IP address and the like. | |
| MTC server identifier | Information for identifying a MTC server capable of requesting a device triggering through mobile network of a mobile network operator which can use one of MSISDN, FQDN (Fully Qualified Domain Name), NAI (Network Access Identifier), SIP URI, IP address and the like and be used for billing a device triggering and the like. | |
| Application ID | Information for identifying an application which is operated in a MTC device user terminal by a trigger request of a MTC server. | |
| Priority | Information indicating priority and urgent process necessary for indicating whether there is priority (e.g., whether there is performed the trigger request in case of a number of the trigger request which must be processed than the network capacity) in a overload state of mobile network of a mobile network operator. | |
| Application specific information | Information specific for being used by an application/function of a MTC device to which a trigger request is delivered (e.g., the number of port of a target application, URL and the like). | |

Next, the MTC-IWF 120 transmits the trigger request message to the SMS-SC 118. The MTC-IWF 120 may be provided with the SME function capable of transmitting and receiving the short message using the SMS-SC 118. The MTC-IWF 120 may transmit the trigger request message by using protocol for an interface between SME and the SMS-SC based on TCP/IP such as SMPP (Short Message Peer to Peer) protocol, and a changed protocol thereof. The MTC-IWF 120 may know the IP address of the SMS-SC capable of receiving the trigger request in advance and the SMS-SC 118 may receive information about the MTC-IWF 120 in advance.

The MTC-IWF 120 may transmit the trigger request including the information of the table 2 to the SMS-SC 118. The MTC-IWF 120 may add the information of the table 2, for example, information on the protocol identifier for indicating that the transmitted message through protocol is for the terminal triggering, or message retransmission method including the time and the number thereof when it fails to transmit the SMS from the SMS-SC 118 to the terminal 102, to the trigger request and transmit it to the SMS-SC 118.

When any other terminal identifier (e.g., FQDN (Fully Qualified Domain Name), NAI (Network Access Identifier), SIP (Session Initiation Protocol) URI (Uniform Resource Identifier), IP address, and the like) is used except for the MSISDN as the terminal identifier included in the trigger request from the MTC server 104, the MTC-IWF 120 may map the information of the terminal identifier except for the MSISDN to information on the IMSI identifier capable of identifying in the mobile network of the mobile network operator and transmit it to the SMS-SC 118. The MTC-IWF 120 may be provided with a table capable to mapping the information on the terminal identifier except for the MSISDN to the information on the IMSI identifier of the terminal 102 in advance. Alternatively, the HLR/HSS 114 may be provided with the mapping table in advance and then the MTC-IWF 120 may interrogate the information on the IMSI identifier of the terminal 102 to the HLR/HSS 114 through the MAP protocol using the terminal identifier.

The SMS-SC 118 may perform functions such as the load control for the trigger request from the MTC-IWF 120, the authentication for the MTC-IWF 120 and the like.

In order to perform the load control for the trigger request, the SMS-SC 118 may perform the load control by managing the number of the incoming trigger requests from specific MTC server 104 or the number of the incoming trigger requests from all MTC servers 104. If either the number of the incoming trigger requests from specific MTC server 104 or the number of the incoming trigger requests from all MTC servers 104 exceeds the predetermined threshold value, or if request information restricting the trigger request for the specific terminal or all terminal, is input through the wireless network of the mobile network operator (for example, by the input of the operator), the SMS-SC 118 may either restrict the process for new trigger requests and report to the MTC-IWF 120 that it is unable to process the trigger request because of the overload state. If the SMS-SC 118 keeps the trigger request until the overload state is released and then the overload state is released, it is capable of restarting the process of the trigger request. It is possible to perform the process of the trigger request based on the priority in the table 2 despite the overload state.

In order to permit the MTC-IWF 120 authority, the SMS-SC 118 may be provided with information on the identifier of the MTC-IWF 120 (i.e., IP address) to enable the capability of requesting the terminal triggering through the short message in advance.

In order to transmit the trigger through the SMS, the SMS-SC 118 may deliver the trigger request to the terminal 102 using a mobile terminated SMS procedure. The SMS-SC 118 may map some of information included in the received trigger request from the MTC-IWF 120 to one of SMS application protocol parameter, SMS transfer layer protocol parameter and SMS relay layer protocol parameter to be deliver.

In detail, the SMS-SC 118 may transmit the message including the terminal triggering request to the SMS-GMSC 116 at step S404. The SMS-GMSC 116, if necessary, interrogates the routing information to HLR/HSS 114 at step S405. The SMS-GMSC 116 transmits the message including the terminal triggering request to the corresponding MSC/SGSN 112 based on the routing information at step S406. The MSC/SGSN 112 transmits the message including the terminal triggering request to the terminal 102 at step S407. The MSC/SGSN 112 reports the success or the failure of the transmission to the SMS-GMSC 116 at step S408. The SMS-SMSC 116 updates, to HLR/HSS 114, the status of transmission report, for example, the addition of the address of the SMS-SC to the message waiting list when failed at step S409, and reports the success or the failure of the transmission to the SMS-SC 118 at step S410. The SMS-SC 118 reports the success or the failure of the transmission to the MTC-IWF 120 at step S411. If the MTC-IWF 120 receives the report about the success of the transmission, at step S412, it deletes the information stored at step S402. The MTC-IWF 120 transmits the success or the failure of the transmission, the cause of the failure, and the like to the MTC server 104 at step S413. Furthermore, the terminal 102 initiates the data communication with the MTC server 104 at step S414.

If one or more of the SMS-GMSC, the SMS-SC and HSS fails to transmit the message at step S409, information may be included indicating whether the message that it failed to transmit is equal to the message for the device triggering in the message waiting list. Alternatively, if, at step S409, one or more of the SMS-GMSC, the SMS-SC and HSS fails to transmit the message because of the overload, information to indicate whether the message it fails to transmit is equal to the failed message for the device triggering or whether the cause of the failure with the overload in the message waiting list is according to the alternative method. If one or more of the SMS-GMSC, the SMS-SC and HSS fails to transmit the message at step S409, the information above according to the alternative may not be included.

The SMS-SC 118 may transmit the message including some of the received information included in the trigger request at step S404. Some of the information above may be mapped to the SMS application layer protocol parameter, the SMS transfer layer protocol parameter, or the SMS relay layer protocol parameter for delivery.

For example, the SMS-SC 118 may make the information on the validity time be included in the trigger request in the SMS application layer protocol parameter or the SMS transfer layer protocol parameter (e.g., TP-VP (Transfer Protocol-Validity Period)), and deliver it.

The SMS-SC 118 may make the information on the priority included in the trigger request be included in the SMS application layer protocol parameter or the SMS transfer layer protocol parameter or SMS relay layer protocol (e.g., RP-Priority-Request), and deliver it. The information on the priority may be delivered as its value or mapping relationship. The information on the priority may be used for processing a message in the network with priority or determining, by the terminal 102, priority of network access used for the configuration of PDD context and the like.

The SMS-SC 118 may make the information on the application ID included in the trigger request being included in the SMS transfer layer protocol parameter, for example TP-UD (Transfer Protocol-User Data), and deliver it. The value of the application ID may be the value of an application port and have an address range with 8 or 16 bits. The value of the application ID may be used for identifying trigger application/function performed by the terminal 102.

The SMS-SC 118 may make the information on the protocol identifier included in the trigger request be included in the SMS transfer layer protocol parameter, for example TP-PID (TP-Protocol Identifier), and deliver it. The information on the protocol identifier may identify whether or not the message is the short message for the MTC apparatus triggering and be used for identifying the procedure on a message, retransmission scheme and the like.

When the MTC server 104 uses any other terminal identifier except for the MSISDN as the terminal identifier and the MTC-IWF 120 changes the terminal identifier to the IMSI and transmits it to the SMS-SC 118, the SMS-GMSC 116 may interrogate the routing information using the IMSI information to the message over the MAP protocol.

Meanwhile, when the SMS-SC 118 receives the report about the failure of transmission of the short message for terminal triggering within the validity time included in the trigger request from the MTC-IWF 120, it may report the result thereof to the MTC-IWF 120. In this case, the SMS-SC 118 may select the retransmission scheme and the number of the retransmissions for the trigger request and try to perform the retransmission of the trigger request message. If the retransmission performance is not configured, the SMS-SC 118 may not try to perform it. If the validity time included in the trigger request from the MTC-IWF 120 is exceeded, the SMS-SC 118 may discard the short message for the trigger request and report it to the MTC-IWF 120.

Meanwhile, when MTC-IWF 120 receives the trigger request with information on the same terminal identifier and/or the same MTC server identifier within the validity time included in the previous trigger request, the MTC-IWF 120 may determine the following trigger request as a duplicate message and report the result to the MTC server 104. As to one example, the MTC-IWF 120 may delete the duplicate message. As to other example, the MTC-IWF 120 may update the information included in the previous trigger request with the information included in the duplicate message.

Furthermore, when the SMS-SC 118 receives the trigger request with information on the same terminal identifier and/or the same MTC server identifier within the validity time included in the previous trigger request, the SMS-SC 118 may determine the following trigger request as a duplicate message and report the result to the MTC-IWF 120. As to one example, the SMS-SC 118 may delete the duplicate message. As to another example, the SMS-SC 118 may update the information included in the previous trigger request with the information included in the duplicate message.

Figure 5:
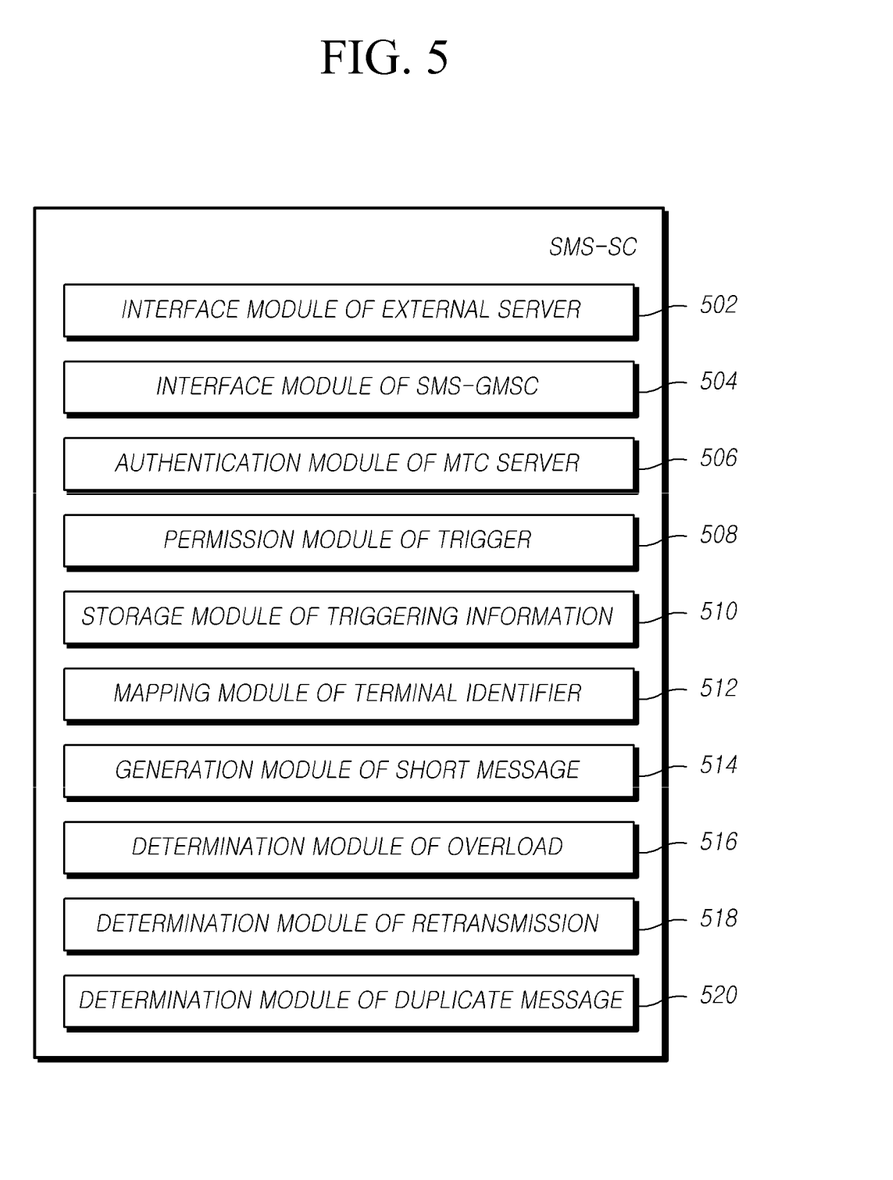
FIG. 5 is a block diagram illustrating a structure of the SMS SC according to one embodiment.

FIG. 5 is a block diagram illustrating a structure of the SMS-SC 118 according to one embodiment.

Referring to FIG. 5, the SMS-SC 118 may include an interface module of external server 502, an interface module of SMS-GMSC 504, an authentication module of MTC server 506, a permission module of trigger 508, a storage module of triggering information 510, a mapping module of terminal identifier 512, a generation module of short message 514, a determination module of overload 516, a determination module of retransmission 518 and a determination module of duplicate message 520.

The interface module of external server 502 may receive the triggering message from the MTC server 104 or the MTC-IWF 120 and report the success or the failure of delivering the trigger message, the cause of the failure and the like to the MTC server 104 or the MTC-IWF 120. The interface module of SMS-GMSC 504 may transmit the generated short message to the SMS-GMSC 116 and receive the report about the success or the failure of delivering the trigger message and the cause of the failure from the SMS-GMSC 116.

The authentication module of MTC server 506 may perform the authentication for the MTC server 104. The authentication module of MTC server 506 may be provided with the information on the identifier of the MCT server 104.

The permission module of trigger 508 may perform the permission for the MTC server 104 capable of transmitting the trigger message for the specific terminal 102. The permission module of trigger 508 may include the mapping table between the identifier of the terminal 102 and the identifier of the MTC server 104 capable of permitting the trigger. The permission module of the trigger 508 may also access the mapping information to the external entity such as the HLR/HSS 114 provided with the mapping table.

The storage module of triggering information 510 stores information included in the trigger request received from the MTC server 104 directly or through the MTC-IWF 120.

When the external identifier of the terminal 102 included in the trigger request may not be any other type except for the MSISDN (e.g., FQDN (Fully Qualified Domain Name), NAI (Network Access Identifier), SIP URI (Session Initiation Protocol Uniform Resource Identifier), IP address, and the like), the mapping module of the terminal identifier 512 maps the identifier of the terminal 102 to the IMSI. It may include the mapping table between the identifier of the terminal 102 and the IMSI. It may also interrogate the mapping information of the external entity such as the HLR/HSS 114 provided with the mapping table.

The generation module of the short message 514 generates the short message based on the trigger request received from the MTC server 104 or the MTC-IWF 120.

The determination module of overload 516 may determine the overload state based on the number of the trigger requests from a specific MTC server or all MTC servers, not perform the transmission of the message for the trigger request for the terminal 102 in case of the overload state, and report the result to the MTC server 104 or the MTC-IWF 120. The determination module of overload 516 may control transmission of the trigger request message to the terminal if the overload state is released within the validity time.

When receiving the report about the failure of the transmission for the trigger request message, the determination module of retransmission 518 may report it along with the cause of the failure to the MTC server 104 or the MTC-IWF 120, select the retransmission scheme or the number thereof from the trigger request and try the retransmission of the trigger request message. When receiving the report about the failure of the transmission for the trigger request after the validity time, the determination module of retransmission 518 may report it along with the cause of the failure to the MTC server 104 or the MTC-IWF 120 and discard information on the trigger request.

When receiving the trigger request including one or more of an identifier of the terminal and the identifier of MTC server, and the same ones thereof included in the previous trigger message within the validity time of the previous trigger request, the determination module of the duplicate message 520 determines the following trigger request as a duplicate message. The determination module of duplicate message 520 may report the reception of the following duplicate message to the MTC server 104 or the MTC-IWF 120.

Figure 6:
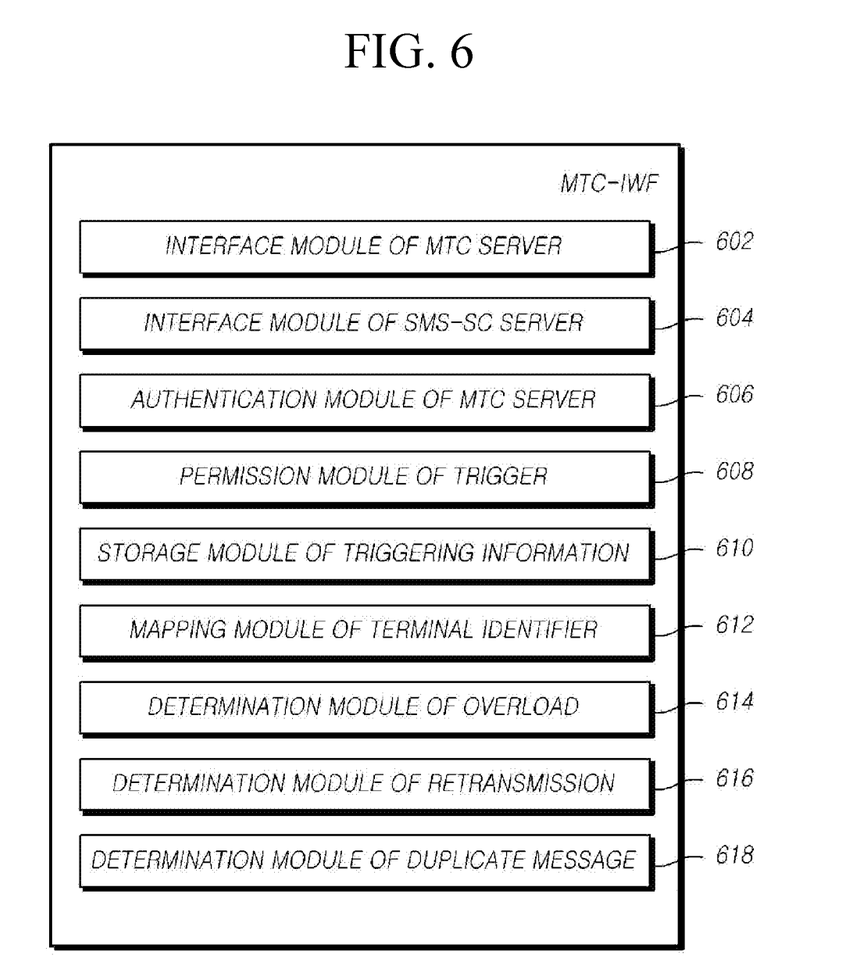
FIG. 6 is a block diagram illustrating a structure of the MTC-IWF according to one embodiment.

FIG. 6 is a block diagram illustrating a structure of the MTC-IWF 120 according to one embodiment.

Referring to FIG. 6, the MTC-IWF 120 may include an interface module of MTC server 602, an interface module of SMS-SC server 604, an authentication module of MTC server 606, a permission module of trigger 608, a storage module of triggering information 610, a mapping module of terminal identifier 612, a determination module of overload 614, a determination module of retransmission 616 and a determination module of duplicate message 618.

The interface module of external server 602 may receive the triggering message from the MTC server 104 and report the success or the failure of delivering the trigger message, the cause of the failure and the like to the MTC server 104. The interface module of SMS-SC 604 may transmit the triggering message to the SMS-SC 118 and receive the report about the success or the failure of delivering the trigger message and the cause of the failure from the SMS-SC 118.

The authentication module of MTC server 606 may perform the authentication for the MTC server 104. The authentication module of MTC server 606 may be provided with the information on the identifier of the MCT server 104.

The permission module of trigger 608 may perform the permission operation for the MTC server 104 capable of transmitting the trigger message for the specific terminal 102. The permission module of trigger 608 may include the mapping table between the identifier of the terminal 102 and the identifier of the MTC server 104 capable of permitting the trigger. The permission module of trigger 608 may also interrogate the mapping information to the external entity such as the HLR/HSS 114 being provided with the mapping table.

The storage module of triggering information 610 stores information included in the trigger request received from the MTC server 104.

When the external identifier of the terminal 102 included in the trigger request may not be any other type except for the MSISDN (e.g., FQDN (Fully Qualified Domain Name), NAI (Network Access Identifier), SIP URI (Session Initiation Protocol Uniform Resource Identifier), IP address, and the like), the mapping module of terminal identifier 612 maps the identifier of the terminal 102 to the IMSI. The mapping module of terminal identifier 612 may include the mapping table between the identifier of the terminal 102 and the IMSI. The mapping module of terminal identifier 612 may also interrogate the mapping information to the external entity such as the HLR/HSS 114 involving the mapping table.

The determination module of overload 614 may determine the overload state based on the number of trigger requests from a specific MTC server or all MTC servers, suspend the transmission of the message for the trigger request for the terminal 102 in case of the overload state and report the result to the MTC server 104. The determination module of overload 614 may control transmission of the trigger request message to the terminal if the overload state is released within the validity time.

When receiving the report about the failure of the transmission for the trigger request message, the determination module of retransmission 616 may report it along with the cause of the failure to the MTC server 104, select the retransmission scheme or the number thereof from the trigger request and try the retransmission of the trigger request message. When receiving the report about the failure of the transmission for the trigger request after the validity time, the determination module of retransmission 616 may report it along with the cause of the failure to the MTC server 104 and discard information on the trigger request.

When receiving the trigger request including one or more of an identifier of the terminal, the identifier of MTC server and the same ones thereof included in the previous trigger message within the validity time of the previous trigger request, the determination module of duplicate message 618 determines whether the following trigger request is a duplicate message. The determination module of duplicate message 618 may report the reception of the following duplicate message to the MTC server 104.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A trigger request delivery server comprising at least one hardware processor that executes:
   an interface module of a server side configured to receive a trigger request for triggering a terminal from a machine type communication (MTC) external server, wherein the trigger request includes (i) an identifier of the terminal to be triggered and (ii) a validity time to store the trigger request in a network when the trigger request is not delivered to the terminal;
   a terminal identifier mapping module configured to:
      determine whether the identifier of the terminal included in the trigger request is a mobile subscriber ISDN number (MSISDN) or a non-MSISDN identifier, wherein the non-MSISDN identifier includes at least one of a fully qualified domain name (FQDN), a network access identifier (NAI), a session initiation protocol uniform resource identifier (SIP URI), and an Internet protocol (IP) address; and
      map the identifier of the terminal to an IMSI (International Mobile Subscriber Identity), capable of identifying in a mobile network, of the terminal when the identifier of the terminal is the non-MSISDN identifier; and
   an interface module of a short message server side configured to:
      generate a first short message using the trigger request and the IMSI of the terminal according to a short message service (SMS) protocol when the identifier of the terminal is the non-MSISDN identifier, wherein the first short message is generated to include the IMSI of the terminal such that the IMSI is used as information identifying the terminal in the mobile network, generate a second short message using the trigger request and the MSISDN of the terminal according to the SMS protocol when the identifier of the terminal is the MSISDN, wherein the second short message is generated to include the MSISDN of the terminal such that the MSISDN is used as information identifying the terminal in the mobile network, and transmit the generated first short message or the generated second short message to a short message server such that the first short message or the second short message is delivered by the short message server to the terminal through the mobile network.

2. The trigger request delivery server of claim 1, wherein the terminal identifier mapping module interrogates a HLR/HSS (Home Location Register/Home Subscriber Server) in order to map the identifier of the terminal to the IMSI (International Mobile Subscriber Identity) of the terminal.

3. The trigger request delivery server of claim 1, wherein the validity time is included in a parameter of at least one of the first short message and the second short message.

4. The trigger request delivery server of claim 1, wherein the trigger request comprises at least one of an identifier of the MTC external server, the identifier of the terminal, an identifier of an application operated on the terminal and a priority.

5. The trigger request delivery server of claim 1, further comprising an overload determining module configured to determine an overload by managing a number of trigger requests transmitted from a specific MTC external server or a total number of trigger requests transmitted from all MTC external servers.

6. The trigger request delivery server of claim 5, wherein the trigger request comprises information on a priority.

7. The trigger request delivery server of claim 1, wherein the interface module of the short message server side receives a report with success or failure of delivery of at least one of the first short message and the second short message from the short message server.

8. A short message server comprising at least one hardware processor that executes:

an interface module of a server side configured to receive a trigger request message for triggering a terminal, delivered from a trigger request delivery server configured to deliver a trigger request from a machine type communication (MTC) external server, wherein the trigger request includes (i) an identifier of the terminal to be triggered and (ii) a validity time to store the trigger request in a network when the trigger request is not delivered to the terminal, and an interface module of a terminal side configured to deliver the trigger request message to the terminal, through a mobile network, using a mobile terminated short message, wherein a short message transfer layer parameter represents that the mobile terminated short message is a short message for a MTC device triggering;

wherein the mobile terminated short message includes an IMSI (International Mobile Subscriber Identity) of the terminal mapped to the identifier of the terminal such that the IMSI is used as information identifying the terminal in the mobile network;

wherein the mapping of the identifier of the terminal and the IMSI includes determining whether the identifier of the terminal is a mobile subscriber ISDN number (MSISDN) or a non-MSISDN identifier, and mapping the identifier of the terminal to the IMSI, capable of identifying in the mobile network, of the terminal when the identifier of the terminal is the non-MSISDN identifier;

wherein the non-MSISDN identifier includes at least one of a fully qualified domain name (FQDN), a network access identifier (NAI), a session initiation protocol uniform resource identifier (SIP URI), and an Internet protocol (IP) address; and wherein when the identifier of the terminal is the MSISDN, the mobile terminated short message includes the MSISDN of the terminal such that the MSISDN is used as information identifying the terminal in the mobile network.

9. The short message server of claim 8, wherein at least a portion of the trigger request message is mapped to a SMS application layer protocol parameter, a SMS transfer layer protocol parameter, or SMS relay layer protocol parameter.

10. The short message server of claim 8, wherein an application identifier included in the trigger request message is in a TP-UD (Transfer Protocol-User Data) which is a SMS transfer layer protocol parameter.

11. A method for delivering a trigger request in a short message delivery server delivering the trigger request from a machine type communication (MTC) external server to a terminal, the method comprising:

receiving the trigger request for triggering the terminal from the MTC external server, wherein the trigger request includes (i) an identifier of the terminal to be triggered and (ii) a validity time to store the trigger request in a network when the trigger request is not delivered to the terminal;

determining whether the identifier of the terminal included in the trigger request is a mobile subscriber ISDN number (MSISDN) or a non-MSISDN identifier, wherein the non-MSISDN identifier includes at least one of a fully qualified domain name (FQDN), a network access identifier (NAI), a session initiation protocol uniform resource identifier (SIP URI), and an Internet protocol (IP) address;

mapping the identifier of the terminal to an IMSI (International Mobile Subscriber Identity), capable of identifying in a mobile network, of the terminal when the identifier of the terminal is the non-MSISDN identifier;

generating a first short message using the trigger request and the IMSI of the terminal according to a short message service (SMS) protocol when the identifier of the terminal is the non-MSISDN identifier, wherein the first short message is generated to include the IMSI of the terminal such that the IMSI is used as information identifying the terminal in the mobile network;

generating a second short message using the trigger request and the MSISDN of the terminal according to the SMS protocol when the identifier of the terminal is the MSISDN, wherein the second short message is generated to include MSISDN of the terminal such that the MSISDN is used as information identifying the terminal in the mobile network; and transmitting the generated first short message or the generated second short message to a short message server such that the first short message or the second short message is delivered by the short message server to the terminal through the mobile network.

12. The method of claim 11, wherein the mapping comprises interrogating a HLR/HSS (Home Location Register/Home Subscriber Server) and so mapping the identifier of the terminal to the IMSI (International Mobile Subscriber Identity) of the terminal.

13. The method of claim 11, wherein the validity time is included in a parameter of at least one of the first short message and the second short message.

14. The method of claim 11, wherein the trigger request comprises at least one of an identifier of the MTC external server, the identifier of the terminal, an identifier of an application operated on the terminal, and a priority.

15. The method of claim 11, further comprising:
   determining an overload state by managing at least one of a number of trigger requests transmitted from a specific MTC external server and a total number of trigger requests transmitted from all MTC external servers.

16. The method of claim 15, wherein the trigger request comprises information on a priority.

17. The method of claim 11, further comprising:
   receiving a report on a success or a failure of the delivery of at least one of the first short message and the second short message from the short message server.

* * * * *